(12) United States Patent
Choe et al.

(10) Patent No.: US 9,170,327 B2
(45) Date of Patent: Oct. 27, 2015

(54) APPARATUS AND METHOD FOR PROVIDING OBSTACLE INFORMATION IN AUTONOMOUS MOBILE VEHICLE

(75) Inventors: Tok Son Choe, Daejeon (KR); Yong Woon Park, Daejeon (KR); Young Il Lee, Sejong-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 336 days.

(21) Appl. No.: 13/878,681

(22) PCT Filed: Sep. 14, 2011

(86) PCT No.: PCT/KR2011/006755
§ 371 (c)(1),
(2), (4) Date: Apr. 10, 2013

(87) PCT Pub. No.: WO2012/050305
PCT Pub. Date: Apr. 19, 2012

(65) Prior Publication Data
US 2013/0222174 A1    Aug. 29, 2013

(30) Foreign Application Priority Data
Oct. 11, 2010 (KR) ........................ 10-2010-0098592

(51) Int. Cl.
*G01S 13/86* (2006.01)
*G05D 1/02* (2006.01)
(Continued)

(52) U.S. Cl.
CPC ............ *G01S 13/865* (2013.01); *G05D 1/0248* (2013.01); *G05D 11/006* (2013.01); *B60W 30/16* (2013.01)

(58) Field of Classification Search
CPC .. G01S 13/865; G05D 1/0248; G05D 11/006; B60W 30/16
USPC ................ 342/54, 70–72; 340/435, 436, 903; 701/301
See application file for complete search history.

(56) References Cited

U.S. PATENT DOCUMENTS 5,307,136 A * 4/1994 Saneyoshi ................... 356/3.14
6,055,042 A   4/2000 Sarangapani
(Continued)

FOREIGN PATENT DOCUMENTS

KR         101273245 B1 *  6/2013

OTHER PUBLICATIONS

Srini, A Vision for Supporting Autonomous Navigation in Urban Environments, Dec. 2006, p. 68-77.
(Continued)

*Primary Examiner* — John B Sotomayor
(74) *Attorney, Agent, or Firm* — Harness, Dickey & Pierce, P.L.C.

(57) ABSTRACT

An apparatus for providing obstacle information in an autonomous mobile vehicle and a method thereof, in which a target object is determined to be what obstacle by combining pieces of information received from a laser distance sensor and radars, thereby enabling the autonomous driving of a vehicle. The apparatus and method for providing obstacle information in an autonomous mobile vehicle, which is capable of providing robust obstacle information not only in environments normal times, but also dust environments by combining a laser distance sensor and radars. A problem that an obstacle through which a mobile unit can pass, such as dust, is mistaken for an obstacle through which the mobile unit cannot pass can be solved.

8 Claims, 5 Drawing Sheets

(51) Int. Cl.
*G05D 11/00* (2006.01)
*G01S 13/93* (2006.01)
*B60W 30/16* (2012.01)

(56) References Cited

U.S. PATENT DOCUMENTS

| | | | |
|---|---|---|---|
| 6,405,132 B1 * | 6/2002 | Breed et al. | 701/301 |
| 8,126,642 B2 | 2/2012 | Trepagnier et al. | |
| 2004/0178943 A1 * | 9/2004 | Niv | 342/29 |
| 2005/0195383 A1 * | 9/2005 | Breed et al. | 356/4.01 |
| 2007/0126564 A1 * | 6/2007 | Lee et al. | 340/435 |
| 2011/0309967 A1 | 12/2011 | Choe et al. | |
| 2013/0222174 A1 * | 8/2013 | Choe et al. | 342/54 |

OTHER PUBLICATIONS

Choe, Development of a Real-Time Collision Avoidance Algorithm for Experimental Autonomous Vehicle, Jul. 2007, p. 1302-1308.
Lee et al., Obstacle Detection and Classification Algorithm using a Laser Scanner, Apr. 2008, p. 677-685.
Veelaert et al., Ultrasonic Potential Field Sensor for Obstacle Avoidance, Aug. 1999, p. 774-779.
Tyco Electronics, M/A-COM Ultra Wideband Radar Sensors, 2007; 2 pages.
Australian Centre for Field Robotics, Sensor Data Integrity: Multi-Sensor Perception for Unmanned Ground Vehicles, Mar. 2009; 2 pages.

* cited by examiner

APPARATUS AND METHOD FOR PROVIDING OBSTACLE INFORMATION IN AUTONOMOUS MOBILE VEHICLE

TECHNICAL FIELD

The present invention relates to a method of providing obstacle information, and more particularly, to a method of providing obstacle information in an autonomous mobile vehicle, in which a target object is determined to be what obstacle by combining pieces of information received from a laser distance sensor and radars, thereby enabling the autonomous driving of a vehicle.

BACKGROUND ART

In order for an autonomous mobile vehicle to smoothly drive, clear obstacle information in various operating environments must be provided.

FIG. 1 is an exemplary diagram showing an environment in which dust is generated when an autonomous mobile vehicle is operated. In case of most of conventional intelligent mobile units, researches have been carried out on a method of detecting obstacles using only a laser distance sensor or an ultrasonic sensor. The method of detecting obstacles using only the laser distance sensor has excellent performance in the accuracy of an angle and distance, but is problematic in that it mistakes an obstacle such as dust 120, such as that shown in FIG. 1, through which a mobile unit can pass for an obstacle through which the autonomous mobile vehicle 110 cannot pass.

PRIOR ART DOCUMENT

Patent Document

Korean Patent No. 10-0899820 (5.21, 2009) entitled 'apparatus and method for determining ground/obstacle for autonomous mobile vehicle' by Choe Tok-son, Chae Jeong-suk, Park Young-woon, and Kim Jun.

Non-Patent Documents

Lee Ki-yong, Hong Seok-gyo, and Jwa Dong-kyeong, "Development of Algorithm for Detecting and Separating Obstacle Using Laser Scanner", The Korean Institute of Electrical Engineers (KIEE) Vol. 57, Issue 4, pp. 677-685, 2008.

Veelaert, P. and Bogaerts, W., "Ultrasonic Potential Field Sensor for Obstacle Avoidance," IEEE Transaction on Robotics and Automation, Vol. 15, Issue 4, pp. 774-779, 2001.

Tyco Electronics, "M/A-COM Ultra Wideband Radar Sensor," 2007.

Australian Center for Field Robotics (ACFR), "Sensor Integrity: Multi-Sensor Perception for Unmanned Ground Vehicle", ACFR-TR-2009-002, 2009

DISCLOSURE OF INVENTION

Technical Problem

Accordingly, the present invention has been made in view of the above problems, and it is an object of the present invention to provide an apparatus and method for providing obstacle information in an autonomous mobile vehicle, which is capable of providing robust obstacle information not only in environments normal times, but also dust environments by combining a laser distance sensor and radars.

Solution to Problem

To achieve the above object, an apparatus for providing obstacle information in an autonomous mobile vehicle according to an aspect of the present invention includes a laser distance sensor disposed in a center of a front of the autonomous mobile vehicle and configured to detect a target object placed ahead of the autonomous mobile vehicle; a sensor driving device configured to drive an elevation angle of the laser distance sensor; a controller configured to control a driving of the sensor driving device; a plurality of radars disposed on a lower front side of the autonomous mobile vehicle and configured to detect the target object ahead of the autonomous mobile vehicle; and an operation unit disposed within the autonomous mobile vehicle and configured to perform specific data processing. The operation unit includes a sensor control unit configured to control the laser distance sensor through the controller; a command generation unit configured to generate a series of commands according to operating environments of the autonomous mobile vehicle; a laser distance sensor data acquisition unit connected to the laser distance sensor and configured to receive distance data for each angle therefrom; a laser distance sensor data conversion unit configured to convert the distance data for each angle, received from the laser distance sensor, into virtual distance sensor data having the range of 360°; a radar data acquisition unit connected to the plurality of radars and configured to receive distance data for each angle; a radar data conversion unit configured to convert the distance data for each angle, received from the radars, into virtual distance sensor data having the range of 360°; a data combination and generation unit configured to determine whether the target object exists by comparing the converted distance data for each of all the angles, received from the laser distance sensor, and the converted distance data for each of all the angles, received from the radars, if, as a result of the determination, the target object is determined to exist, storing the converted distance data for the angles, received from the radars, and if, as a result of the determination, the target object is determined not to exist, storing the converted virtual distance sensor data and generates distance data for each of the angles; and a transmission unit configured to send the generated distance data for the angles to a collision avoidance unit of the autonomous mobile vehicle.

In the apparatus for providing obstacle information in an autonomous mobile vehicle according to a detailed object of the present invention, the laser distance sensor comprises a laser distance sensor, having multiple layers capable of detecting the range of 100° or more ahead of the autonomous mobile vehicle, or two or more single-scan laser distance sensors.

In the apparatus for providing obstacle information in an autonomous mobile vehicle according to a detailed object of the present invention, the plurality of radars may detect the range of more 180° in the horizontal direction.

In the apparatus for providing obstacle information in an autonomous mobile vehicle according to a detailed object of the present invention, the elevation angle of the laser distance sensor is set toward a ground.

In the apparatus for providing obstacle information in an autonomous mobile vehicle according to a detailed object of the present invention, the laser distance sensor data acquisition unit compares the distance data for each of angles between 0° and 100°, received from the laser distance sensor, calculates an inclination of the target object based on results of the comparison, if the inclination for each angle is smaller than a specific reference value, stores a greatest value from among the distance data for the angle as a distance value of the corresponding angle, and if the inclination for each angle is greater than the specific reference value, stores a smallest value from among the distance data for each angle as a distance value of the corresponding angle.

In the apparatus for providing obstacle information in an autonomous mobile vehicle according to a detailed object of the present invention, the elevation angles of the radars are upwardly set on a basis of a horizontal line.

A method of providing obstacle information in an autonomous mobile vehicle according to another aspect of the present invention includes the steps of generating a virtual distance sensor capable of detecting the range of 360° of the autonomous mobile vehicle; receiving distance data for each of the angles from a laser distance sensor and radars; converting the distance data for each angle, received from the laser distance sensor, into data based on the virtual distance sensor; resetting the data of the virtual distance sensor to the distance data for each angle received from the radars; determining whether a target object exists by comparing the converted distance data for each of the angles and the distance data for each of the angles, reset in the virtual distance sensor, if, as a result of the determination, the target object is determined to exist, storing the distance data reset in the virtual distance sensor, and if, as a result of the determination, the target object is determined not to exist, storing the distance data converted into the virtual distance sensor data; and sending the stored distance data for the angles to a collision avoidance unit of the autonomous mobile vehicle.

In the method of providing obstacle information in an autonomous mobile vehicle according to a detailed object of the present invention, the step of receiving the distance data for each of the angles from the laser distance sensor includes the steps of comparing the distance data for each of angles between 0° and 100°, received from the laser distance sensor; calculating an inclination of the target object based on results of the comparison; if the inclination for each angle is smaller than a specific reference value, storing a greatest value from among the distance data for the angle as a distance value of the corresponding angle; and if the inclination for each angle is greater than the specific reference value, storing a smallest value from among the distance data for each angle as a distance value of the corresponding angle.

Advantageous Effects of Invention

In accordance with the apparatus and method for providing obstacle information in an autonomous mobile vehicle according to the present invention, a problem that an obstacle through which a mobile unit can pass, such as dust, is mistaken for an obstacle through which the mobile unit cannot pass can be solved.

DESCRIPTION OF REFERENCE NUMERALS OF PRINCIPAL ELEMENTS IN THE DRAWINGS

Figure 1:
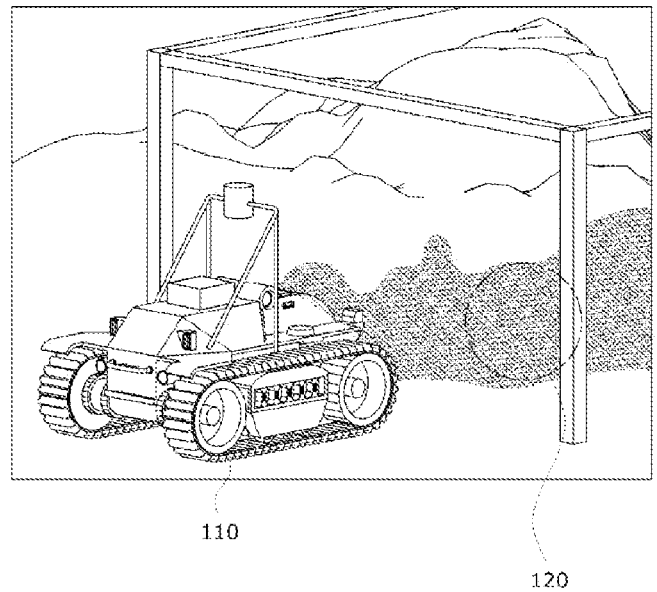
FIG. 1 is an exemplary diagram showing an environment in which dust is generated when an autonomous mobile vehicle is operated.

110: autonomous mobile vehicle 120: dust environment
210: laser distance sensor apparatus
211: laser distance sensor 213: sensor driving device
212: controller 234: command generation unit
220: radar 230: operation unit
231: laser distance sensor data acquisition unit
232: sensor control unit 233: radar data acquisition unit
235: laser distance sensor data conversion unit
236: radar data conversion unit
237: data combination and generation unit 238: transmission unit
240: collision avoidance unit

MODE FOR THE INVENTION

Some embodiments of the present invention will be described in detail below with reference to the accompanying drawings.

Figure 2:
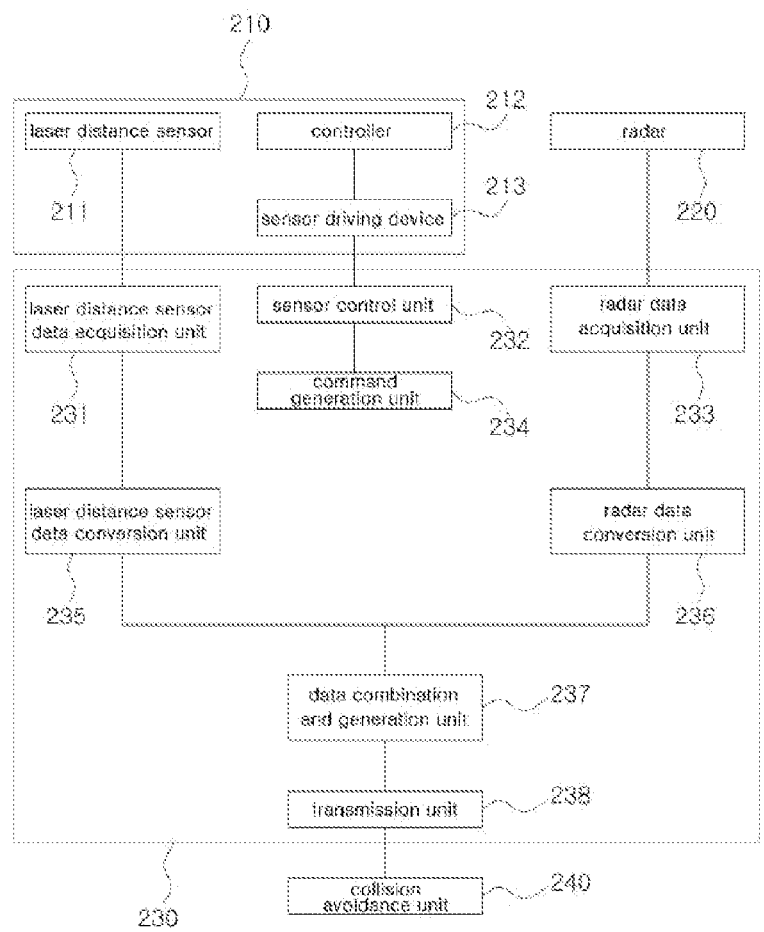
FIG. 2 shows the configuration of an apparatus for providing obstacle information in an autonomous mobile vehicle according to an embodiment of the present invention.

FIG. 2 shows the configuration of an apparatus for providing obstacle information in an autonomous mobile vehicle according to an embodiment of the present invention.

As shown in FIG. 2, the apparatus for providing obstacle information in an autonomous mobile vehicle according to an embodiment of the present invention includes a laser distance sensor 211, a sensor driving device 213, a controller 212, a plurality of radars 220, and an operation unit 230. The laser distance sensor 211 is disposed in the center of the front of the autonomous mobile vehicle and configured to detect a target object placed ahead of the autonomous mobile vehicle. The sensor driving device 213 drives the elevation angle of the laser distance sensor 211. The controller 212 controls the driving of the sensor driving device 213. The plurality of radars 220 is disposed on a lower front side of the autonomous mobile vehicle and configured to detect the target object ahead of the autonomous mobile vehicle. The operation unit 230 is disposed within the autonomous mobile vehicle and configured to perform specific data processing.

The operation unit 230 includes a sensor control unit 232, a command generation unit 234, a laser distance sensor data acquisition unit 231, a laser distance sensor data conversion unit 235, a radar data acquisition unit 233, a radar data conversion unit 236, a data combination and generation unit 237, and a transmission unit 238. The sensor control unit 232 controls the laser distance sensor 211 through the controller 212. The command generation unit 234 generates a series of commands according to operating environments of the autonomous mobile vehicle. The laser distance sensor data acquisition unit 231 is connected to the laser distance sensor 211 and configured to receive distance data for each angle therefrom. The laser distance sensor data conversion unit 235 converts the distance data for each angle, received from the laser distance sensor 211, into virtual distance sensor data having the range of 360°. The radar data acquisition unit 233 is connected to the plurality of radars 220 and configured to receive distance data for each angle. The radar data conversion unit 236 converts the distance data for each angle, received from the radars 220, into virtual distance sensor data having the range of 360°. The data combination and generation unit 237 determines whether the target object exists by comparing the converted distance data for each of all the angles, received from the laser distance sensor 211, and the converted distance data for each of all the angles, received from the radars 220. If, as a result of the determination, the target object is determined to exist, the data combination and generation unit 237 stores the converted distance data for the angles, received from the radars 220. However, if, as a result of the determination, the target object is determined not to exist, the data combination and generation unit 237 stores the converted virtual distance sensor data and generates distance data for each of the angles. The transmission unit 238 sends the generated distance data for the angles to the collision avoidance unit 240 of the autonomous mobile vehicle.

More particularly, the sensor control unit 232 performs control functions according to a variety of modes, such as a position-based control mode, a speed control mode, and an elevation angle scan mode. The laser distance sensor 211 may be a laser distance sensor having multiple layers capable of detecting 100° or more ahead of the autonomous mobile vehicle or may be two or more single-scan laser distance sensors. The number of radars 220 may be a radar or a plurality of radars capable of detecting 100° or more ahead of the autonomous mobile vehicle. Here, the laser distance sensor 211 has the angle resolution of about 1° and the distance accuracy of about 4 cm. The distance resolution has a relatively accurate angle and distance resolution, but has a disadvantage in that it cannot transmit dust, etc. Furthermore, each of the radars 220 has the angle resolution of about 5° and the distance accuracy of about 7.5 cm. The radar 220 has lower performance than the laser distance sensor 211, but has an advantage in that it can transmit dust, etc. For this reason, in the present invention, a combination of the laser distance sensor 211 and the radars 220 has been attempted in order to provide accurate obstacle information both in normal environments and environments in which dust, etc. exists.

Figure 3:
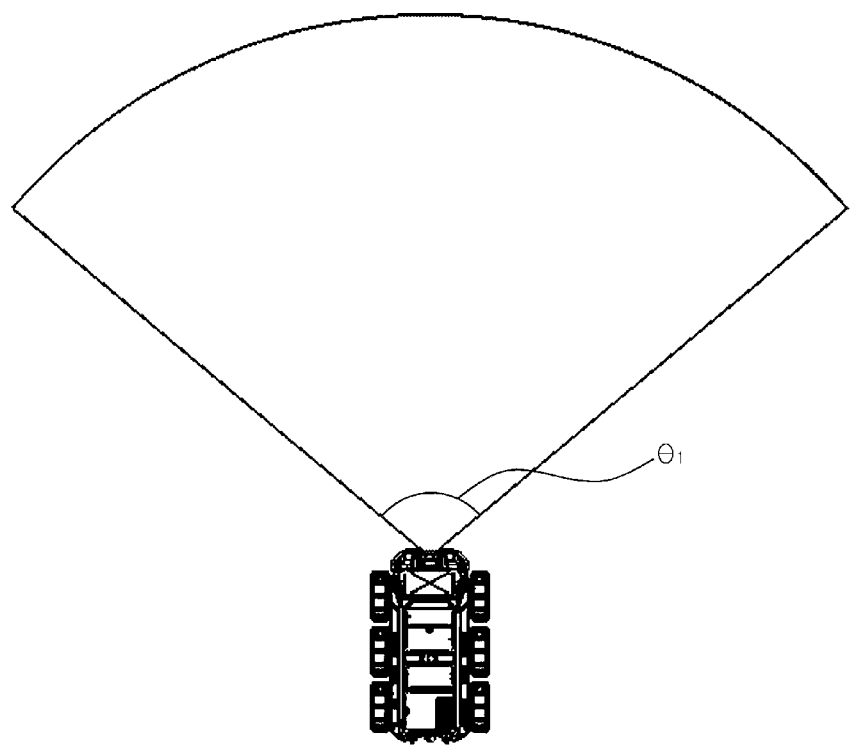
FIG. 3 is a diagram showing the horizontal direction detection range of a laser distance sensor in the apparatus for providing obstacle information in an autonomous mobile vehicle according to the embodiment of the present invention.

FIG. 3 is a diagram showing the horizontal direction detection range of the laser distance sensor 211 in the apparatus for providing obstacle information in an autonomous mobile vehicle according to the embodiment of the present invention.

As shown in FIG. 3, the laser distance sensor 211 is disposed in the center of the front of the vehicle and configured to detect the range of 100° in the horizontal direction. In particular, in order to provide obstacle information for collision avoidance and world model, the laser distance sensor 211 may include four scanning layers, and the elevation angles of the four scanning layers may be set toward the surface of the ground. Here, the elevation angle may be set by a sensor driving device for controlling the elevation angle of the laser distance sensor 211. Through such setting, the laser distance sensor 211 outputs four distance values for each angle. In order to extract the most appropriate distance value from among the four distance values, the laser distance sensor data acquisition unit 231 compares the four distance values for each of the angles between 0° and 100°, received from the laser distance sensor 211 and calculates an inclination of the target object based on results of the comparison. If the inclination for each angle is smaller than a specific reference value, the laser distance sensor data acquisition unit 231 stores the greatest value from among distance values for each angle as a distance value of the corresponding angle. If the inclination for each angle is greater than the specific reference value, the laser distance sensor data acquisition unit 231 stores the smallest value from among distance values for each angle as a distance value of the corresponding angle.

Figure 4:
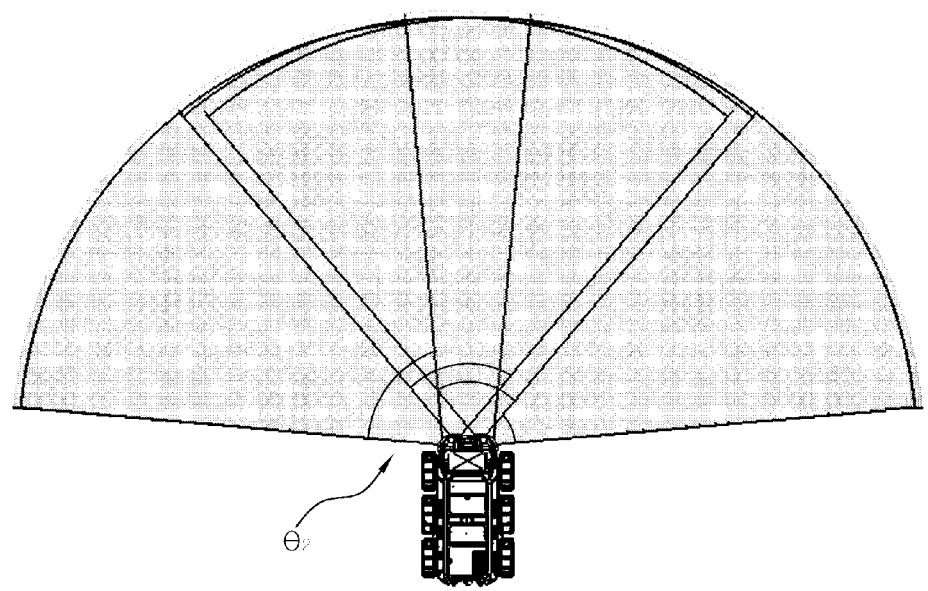
FIG. 4 is an exemplary diagram showing the horizontal direction detection range in the case where four radars are used in the apparatus for providing obstacle information in an autonomous mobile vehicle according to the embodiment of the present invention.

FIG. 4 is an exemplary diagram showing the horizontal direction detection range in the case where the four radars 220 are used in the apparatus for providing obstacle information in an autonomous mobile vehicle according to the embodiment of the present invention.

As shown in FIG. 4, the four radars 220 may be disposed on the lower front side of the autonomous mobile vehicle and each configured to detect the range of 80° in the horizontal direction. Each of the radars 220 has no blind spot, and it may be disposed to have a detection range of about 180°. Furthermore, in the case where the radars 220 are horizontally disposed, the radars may recognize the surface of the ground as an obstacle. In order to avoid the problem, the elevation angle of each of the radars 220 may be set by raising the horizontal reference. Here, distance information and angle information between a target object and the four radars 220 are converted into distance information and angle information in a virtual distance sensor placed in the center of the autonomous mobile vehicle on the basis of the distance information and angle information between the four radars 220 and the virtual distance sensor. Furthermore, in the storage process, the existing information is checked and only converted information is updated and stored. Accordingly, the storage process can be simplified.

Figure 5:
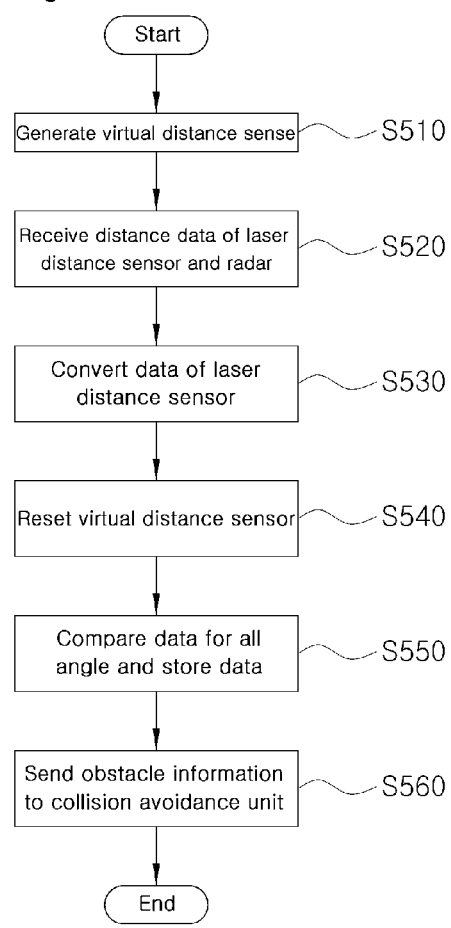
FIG. 5 is a flowchart illustrating a method of providing obstacle information in an autonomous mobile vehicle according to an embodiment of the present invention.

FIG. 5 is a flowchart illustrating a method of providing obstacle information in an autonomous mobile vehicle according to an embodiment of the present invention.

Referring to FIG. 5, the method of providing obstacle information in an autonomous mobile vehicle according to the embodiment of the present invention includes a step S510 of generating a virtual distance sensor capable of detecting the range of 360° of the autonomous mobile vehicle, a step S520 of receiving distance data for each of the angles from the laser distance sensor 211 and the radars 220, a step S530 of converting the distance data for each angle, received from the laser distance sensor 211, into data on the basis of the virtual distance sensor, a step S540 of resetting the data of the virtual distance sensor to the distance data for each angle received from the radars 220, a step S550 of determining whether a target object exists by comparing the converted distance data for each of the angles and the distance data for each of the angles, reset in the virtual distance sensor, if, as a result of the determination, the target object is determined to exist, storing the distance data reset in the virtual distance sensor, and if, as a result of the determination, the target object is determined not to exist, storing the distance data converted into the virtual distance sensor data, and a step S560 of sending the stored distance data for the angles to the collision avoidance unit 240 of the autonomous mobile vehicle.

More particularly, the method of the present invention may be described with it chiefly divided into three steps; a first step of acquiring the data of the laser distance sensor 211 and the radars 220, a second step of performing dust processing based on the acquired data, and a third step of storing dust-processed distance information. In the first step of acquiring the data of the laser distance sensor data and the radars 220, in order to make identical the references of all data, the distance data for each angle of the laser distance sensor 211 has to be converted into distance data for each angle of the virtual distance sensor. The radar data needs not to be converted because combined data is received by the virtual distance sensor in the acquisition step.

In the second step and the third step, the dust processing is performed, and the dust-processed distance information is stored. The second and third steps are performed on all the angles within the detection range 100° of the laser distance sensor 211. First, in the dust processing step of the second step, the validity of radar data for an angle on which dust processing is now being performed is determined. Next, whether an obstacle ahead of the vehicle is dust by comparing the distance value of the radars 220 and the distance value of the laser distance sensor 211. As described above, the laser distance sensor 211 recognizes dust through which the vehicle can pass as an obstacle and the radar 220 does not recognize the dust as an obstacle. Accordingly, in relation to the same position where the dust exists, the laser distance sensor 211 generates data, indicating that the obstacle exists, with respect to the distance of the corresponding angle, and the radar 220 generates data, indicating that there is the obstacle with respect to a distance more distant from the distance where the dust of the corresponding angle exists, or data indicating that there is no obstacle with respect to the corresponding angle. In the dust processing step, if there is a great difference between the distance value of the radar 220 and the distance value of the laser distance sensor 211, it is determined that dust exists in the distance acquired by the laser distance sensor 211 and the distance value of the radar 220 is used as an actual distance value.

Next, in the third step of storing the dust-processed distance value, whether radar data exists at angles adjacent to an angle on which dust processing is now being processed is determined, and a difference between the distance values of the laser distance sensor 211 is checked in order to prevent two or more obstacles from being mistaken for one obstacle. Through the above steps, an obstacle and dust for a corresponding angle can be distinguished and resulting distance values are stored.

In order to verify the method of providing obstacle information in an autonomous mobile vehicle according to the present invention, experiments were carried out using an experimental vehicle. A 6×6 driving type vehicle platform for performing skid steering control was basically used as a vehicle platform used in the experiments. Furthermore, the laser distance sensor 211, having a detection range of 100° or more in the horizontal direction and four layers in the vertical direction, was disposed in the center of the front of the autonomous mobile vehicle. Furthermore, the four radars 220, each having a detection range of 80° or more in the horizontal direction, was disposed on the lower front side of the autonomous mobile vehicle. The two radars 220 placed in the center of the autonomous mobile vehicle, from among the four radars 220, were mounted to direct toward the front, and each of the remaining radars 220 on the left and right sides was mounted to direct toward 45° left and right on the basis of the front direction.

Figure 6:
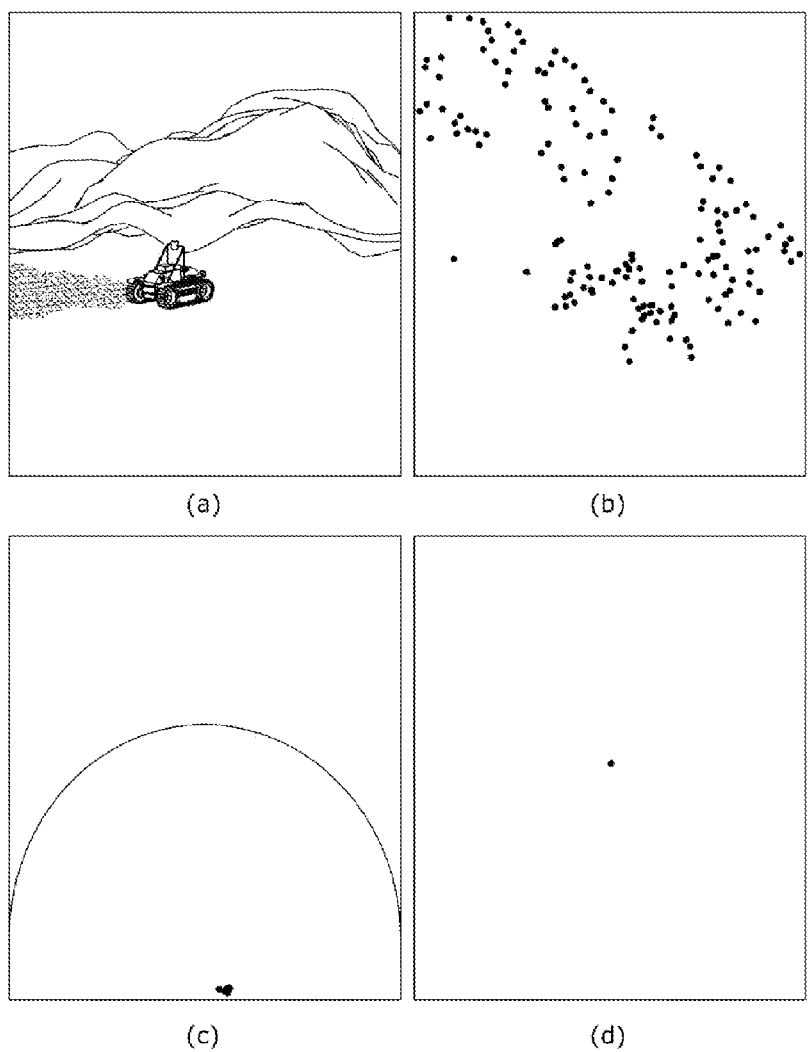
FIG. 6 shows the results of an operation of the method of providing obstacle information in an autonomous mobile vehicle according to the embodiment of the present invention with respect to dust when a vehicle is driven.

FIG. 6 shows the results of an operation of the method of providing obstacle information in an autonomous mobile vehicle according to the embodiment of the present invention with respect to dust when the vehicle is driven. FIG. 6(*a*) shows dust generated in the nearby of the vehicle. FIG. 6(*b*) shows distance data for each angle, acquired by the laser distance sensor 211 at short range, because the dust was generated in the nearby of the vehicle and mistaken for obstacles even though there was no obstacle ahead. FIG. 6(*c*) shows a result when a 4-layer laser distance sensor data combination method was used. FIG. 6(*d*) shows a result when the method of providing obstacle information in an autonomous mobile vehicle according to the present invention was used. FIG. 6(*d*) shows that there was no obstacle in the nearby of the vehicle because the dust was processed.

Figure 7:
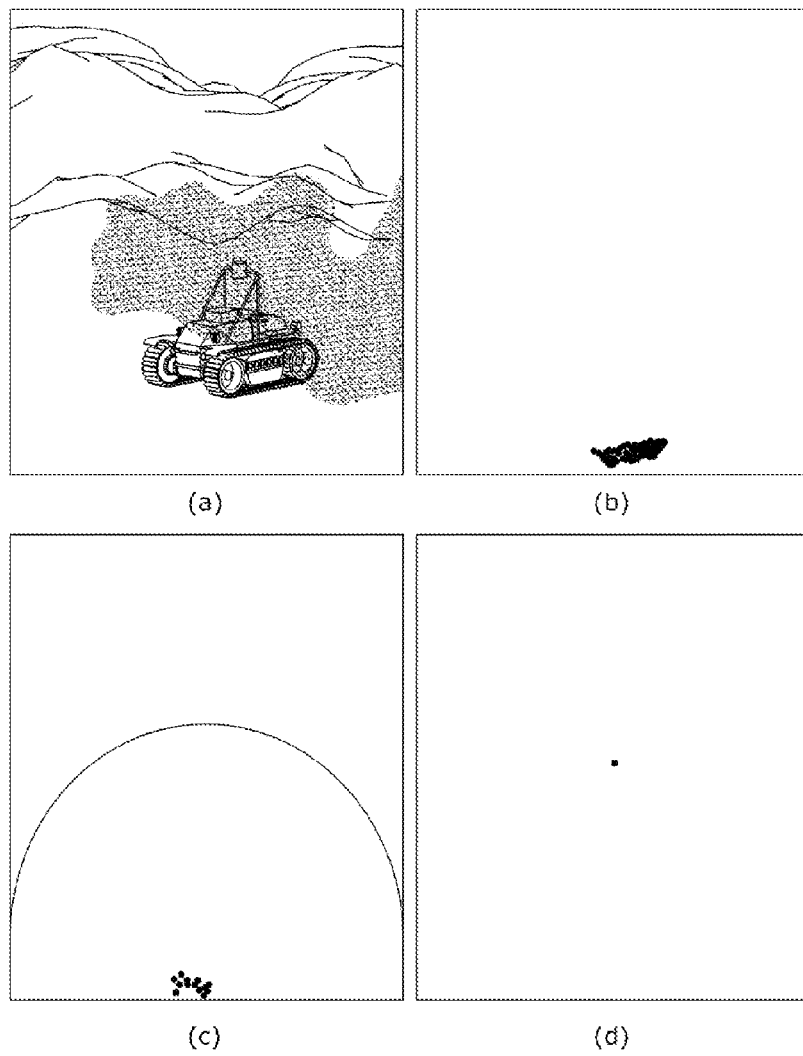
FIG. 7 shows the results of an operation of the method of providing obstacle information in an autonomous mobile vehicle according to the embodiment of the present invention with respect to dust artificially scattered in front of a vehicle.

FIG. 7 shows the results of an operation of the method of providing obstacle information in an autonomous mobile vehicle according to the embodiment of the present invention with respect to dust artificially scattered in front of a vehicle. FIG. 7(*a*) shows dust of a heavy concentration which was artificially generated ahead of the vehicle in the moving direction. FIG. 7(*b*) shows that a laser distance sensor collected distance data at short range because it mistaken the dust for obstacles in most angles owing to the artificially scattered dust even though there is no obstacle ahead. FIG. 7(*c*) shows a result when a 4-layer laser distance sensor data combination method of processing ground and obstacles was used. FIG. 7(*d*) shows a result when the method of providing obstacle information in an autonomous mobile vehicle according to the present invention was used. FIG. 7(*d*) shows that there was no obstacle in the nearby of the vehicle because the dust was processed.

As described above, the apparatus and method for providing obstacle information in an autonomous mobile vehicle according to the present invention can solve a problem that an obstacle through which a mobile unit can pass, such as dust, is mistaken for an obstacle through which the mobile unit cannot pass.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for providing obstacle information in an autonomous mobile vehicle, the apparatus comprising:
   a laser distance sensor disposed in a center of a front of the autonomous mobile vehicle and configured to detect a target object placed ahead of the autonomous mobile vehicle;
   a sensor driving device configured to drive an elevation angle of the laser distance sensor;
   a controller configured to control the sensor driving device;
   a plurality of radars disposed on a lower front side of the autonomous mobile vehicle and configured to detect the target object ahead of the autonomous mobile vehicle; and
   an operation unit disposed within the autonomous mobile vehicle and configured to perform specific data processing,
   wherein the operation unit comprises:
      a sensor control unit configured to control the laser distance sensor through the controller;
      a command generation unit configured to generate a series of commands according to operating environments of the autonomous mobile vehicle;
      a laser distance sensor data acquisition unit connected to the laser distance sensor and configured to receive distance data for each angle therefrom;
      a laser distance sensor data conversion unit configured to convert the distance data for each angle, received from the laser distance sensor, into virtual distance sensor data having a range of 360°;

a radar data acquisition unit connected to the plurality of radars and configured to receive distance data for each angle;

a radar data conversion unit configured to convert the distance data for each angle, received from the radars, into virtual distance sensor data having the range of 360°;

a data combination and generation unit configured to determine whether the target object exists by comparing the converted distance data for each of all the angles, received from the laser distance sensor, and the converted distance data for each of all the angles, received from the radars, if, as a result of the determination, the target object is determined to exist, storing the converted distance data for the angles, received from the radars, and if, as a result of the determination, the target object is determined not to exist, storing the converted virtual distance sensor data and generates distance data for each of the angles; and a transmission unit configured to send the generated distance data for the angles to a collision avoidance unit of the autonomous mobile vehicle; and wherein the laser distance sensor data acquisition unit compares the distance data for each of angles between 0° and 100°, received from the laser distance sensor, calculates an inclination of the target object based on results of the comparison, if the inclination for each angle is smaller than a specific reference value, stores a greatest value from among the distance data for the angle as a distance value of the corresponding angle, and if the inclination for each angle is greater than the specific reference value, stores a smallest value from among the distance data for each angle as a distance value of the corresponding angle.

2. The apparatus as claimed in claim 1, wherein the laser distance sensor comprises a laser distance sensor, having multiple layers capable of detecting a range of 100° or more ahead of the autonomous mobile vehicle, or two or more single-scan laser distance sensors.

3. The apparatus as claimed in claim 2, wherein an elevation angle of the laser distance sensor is set toward a ground.

4. The apparatus as claimed in claim 1, wherein the plurality of radars detects a range of 180° in a horizontal direction.

5. The apparatus as claimed in claim 4, wherein elevation angles of the radars are upwardly set on a basis of a horizontal line.

6. The apparatus as claimed in claim 1, wherein an elevation angle of the laser distance sensor is set toward a ground.

7. The apparatus as claimed in claim 1, wherein elevation angles of the radars are upwardly set on a basis of a horizontal line.

8. A method of providing obstacle information in an autonomous mobile vehicle, the comprising the steps of:

generating a virtual distance sensor capable of detecting a range of 360° of the autonomous mobile vehicle;

receiving distance data for each of the angles from a laser distance sensor and radars;

converting the distance data for each angle, received from the laser distance sensor, into data based on the virtual distance sensor;

resetting the data of the virtual distance sensor to the distance data for each angle received from the radars;

determining whether a target object exists by comparing the converted distance data for each of the angles and the distance data for each of the angles, reset in the virtual distance sensor, if, as a result of the determination, the target object is determined to exist, storing the distance data reset in the virtual distance sensor, and if, as a result of the determination, the target object is determined not to exist, storing the distance data converted into the virtual distance sensor data;

sending the stored distance data for the angles to a collision avoidance unit of the autonomous mobile vehicle;

wherein the step of receiving the distance data for each of the angles from the laser distance sensor includes the steps of:

comparing the distance data for each of angles between 0° and 100°, received from the laser distance sensor;

calculating an inclination of the target object based on results of the comparison;

if the inclination for each angle is smaller than a specific reference value, storing a greatest value from among the distance data for the angle as a distance value of the corresponding angle; and if the inclination for each angle is greater than the specific reference value, storing a smallest value from among the distance data for each angle as a distance value of the corresponding angle.

* * * * *